United States Patent [19]

May

[11] Patent Number: 5,446,783

[45] Date of Patent: Aug. 29, 1995

[54] CELLULAR PHONE WITH INFRARED BATTERY PACK

[75] Inventor: Gregory J. May, Corvallis, Oreg.

[73] Assignee: Hewlett-Packard Company, Palo Alto, Calif.

[21] Appl. No.: 189,568

[22] Filed: Jan. 31, 1994

[51] Int. Cl.⁶ .................... H04Q 7/22; H04M 11/00
[52] U.S. Cl. ................................. 379/59; 379/428; 379/440; 455/90; 455/127; 455/343; 429/7
[58] Field of Search .................. 379/56, 59, 58, 428, 379/440; 455/90, 89, 347, 348, 349, 351; 429/90, 97, 98, 99, 100; 320/2; 359/142, 145, 154

[56] References Cited

U.S. PATENT DOCUMENTS

| | | | |
|---|---|---|---|
| 4,903,325 | 2/1990 | Yoshitake et al. | 455/89 |
| 5,201,067 | 4/1993 | Grube et al. | 455/89 |
| 5,206,097 | 4/1993 | Burns et al. | 429/90 |
| 5,241,410 | 8/1993 | Streck et al. | 379/56 X |
| 5,249,218 | 9/1993 | Sainton | 379/59 |
| 5,251,329 | 10/1993 | Takagi | 455/89 |

FOREIGN PATENT DOCUMENTS

| | | | |
|---|---|---|---|
| 0423733 | 4/1991 | European Pat. Off. | H04M 1/72 |
| 3806463 | 9/1989 | Germany | G06F 3/00 |

*Primary Examiner*—Curtis Kuntz
*Assistant Examiner*—William G. Trost
*Attorney, Agent, or Firm*—Curtis G. Rose; Brent F. Logan

[57] ABSTRACT

A cellular phone has, in addition to an antenna, speaker and microphone, a device interface capable of transmitting electronic information between the cellular phone and an electronic device, such as a computer or modem, when the device is physically connected to the cellular phone. The cellular phone also has a battery pack. The battery pack has, in addition to a battery for powering the cellular phone, an infrared port for transmitting infrared information between the cellular phone and an electronic device with infrared capability. The infrared port is connected to an infrared converter, which is connected to the device interface. The infrared converter converts electronic information to infrared information for transmission between the cellular phone and the device over the infrared port. Existing cellular phones can be upgraded to obtain the ability to communicate with electronic devices over an infrared port by replacing the conventional battery pack contained in the existing cellular phone with an infrared battery pack of the type shown in the various embodiments of the invention.

8 Claims, 7 Drawing Sheets

CELLULAR PHONE WITH INFRARED BATTERY PACK

FIELD OF THE INVENTION

This invention relates to the electronics circuitry field. More particularly, this invention is an infrared battery pack for a cellular phone.

BACKGROUND OF THE INVENTION

The emergence of the cellular phone in the last few years has revolutionized the telecommunications industry. Where in the past telephones were largely confined to homes, offices, and other stationary structures, cellular technology has made it possible for phones to be truly portable and exist nearly anywhere there are people—in cars, on boats, on airplanes, or even on distant mountain tops.

While cellular phones have revolutionized the telecommunications industry, they have had little effect on the computer industry. This is due, at least in part, to the difficulty in connecting cellular phones and computers. Prior attempts at connecting cellular phones and computers have been inefficient and expensive, and normally involve the use of a coaxial or other type of wired cable between the computer and cellular phone to transmit data. This approach defeats the portable nature of the cellular phone (and, possibly the computer as well), and fails to fully realize the potential benefits that could exist with an efficient marriage of cellular and computer technologies.

SUMMARY OF THE INVENTION

It is one aspect of the invention to provide for the efficient transmission of information between a cellular phone and an electronic device.

It is another aspect of the invention to provide an efficient transmission of information between a cellular phone and an electronic device, such as a computer, in a wireless manner.

It is another aspect of the invention to provide an efficient transmission of information between a cellular phone and an electronic device, such as a computer, through the use of an infrared battery pack.

A cellular phone has, in addition to an antenna, speaker and microphone, a device interface capable of transmitting electronic information between the cellular phone and an electronic device, such as a computer or modem, when the device is physically connected to the cellular phone. The cellular phone also has a battery pack. The battery pack has, in addition to a battery for powering the cellular phone, an infrared port for transmitting infrared information between the cellular phone and an electronic device with infrared capability. The infrared port is connected to an infrared converter, which is connected to the device interface. The infrared converter converts electronic information to infrared information for transmission between the cellular phone and the device over the infrared port. Existing cellular phones can be upgraded to obtain the ability to communicate with electronic devices over an infrared port by replacing the conventional battery pack contained in the existing cellular phone with an infrared battery pack of the type shown in the various embodiments of the invention.

DETAILED DESCRIPTION OF THE PREFERRED EMBODIMENT

Figure 1:
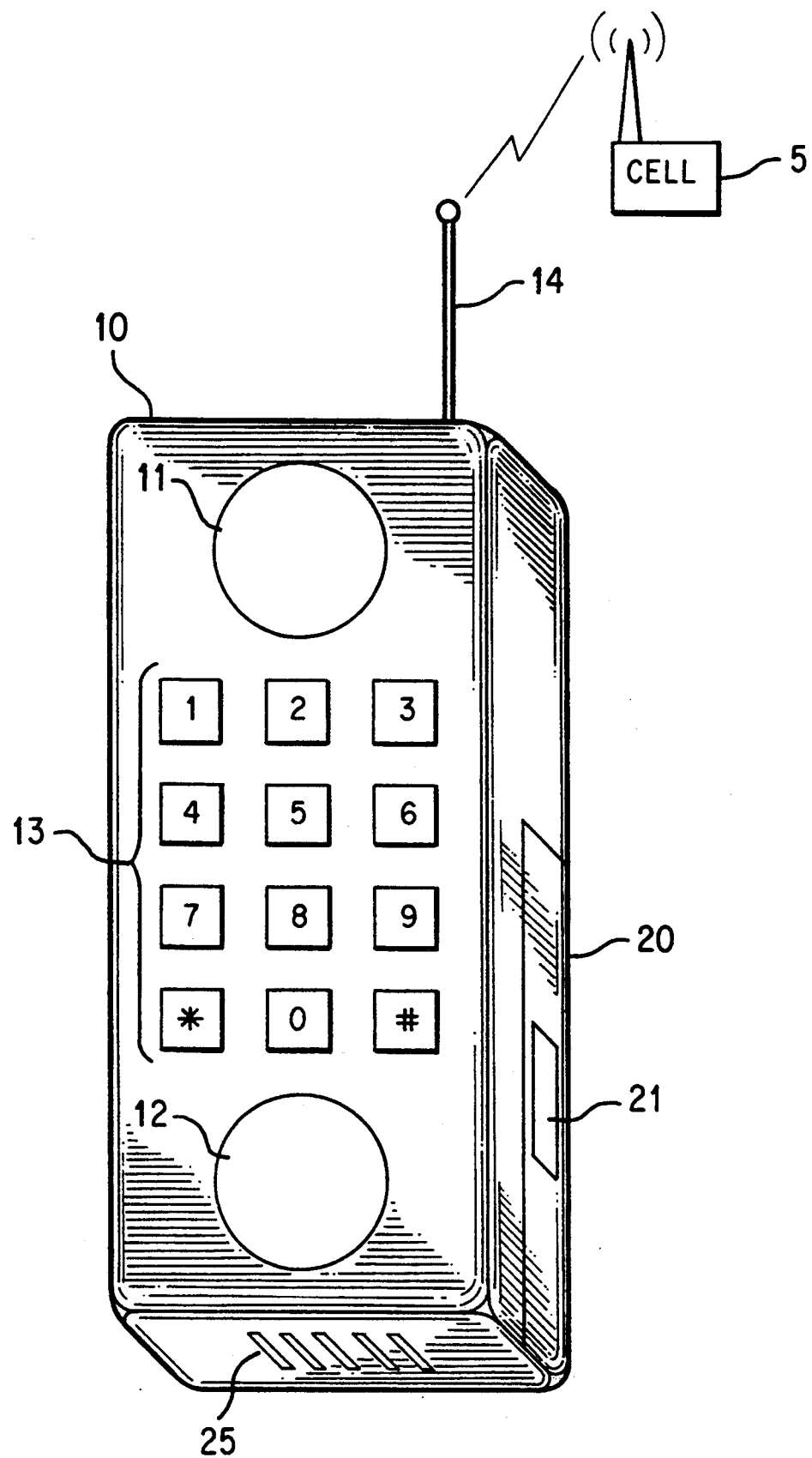
FIG. 1 shows a conventional cellular phone.

FIG. 1 shows conventional cellular phone 10. Cellular phone 10 contains speaker 11, microphone 12, keypad 13, and antenna 14. Cellular phone 10 communicates with telephone cell 5 via RF signals received and sent via antenna 14.

Cellular phone 10 also contains battery pack 20. Battery pack 20 contains one or more batteries 21. Battery pack 20 is removably mounted on the back of cellular phone 10. Cellular phone 10 also contains device interface 25 (FIG. 1). Device interface 25 is capable of transmitting electronic information to an electronic device, such as a modem or computer, when the device is physically connected to cellular phone 10.

Figure 2:
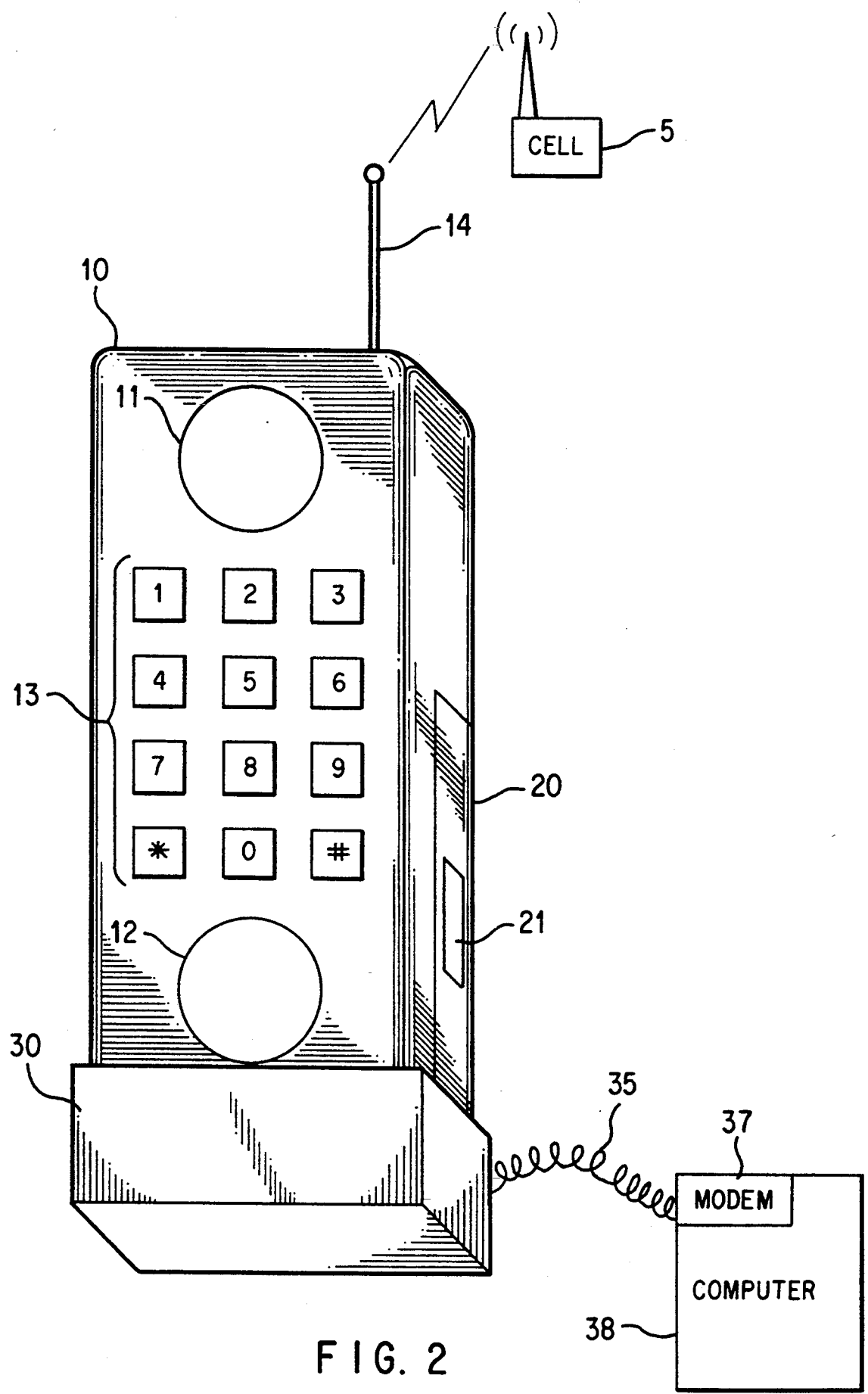
FIG. 2 shows a cellular phone with an attached holster for communicating with an electronic device.

FIG. 2 shows cellular phone 10 with attached holster 30 for communicating with modem 37 in computer 38 via cable 35. Holster 30 slides over the base of cellular phone 10, thereby coveting and connecting to device interface 25. Cable 35 connects device interface 25 with modem 37 in computer 38 so that electronic information can be transmitted between cellular phone 10 and computer 38. Holster 30 of phone 10 is not necessary if interface 25 would allow a direct connection to modem 37, such as would be the case if interface 25 was an RJ-11 jack.

Figure 3A:
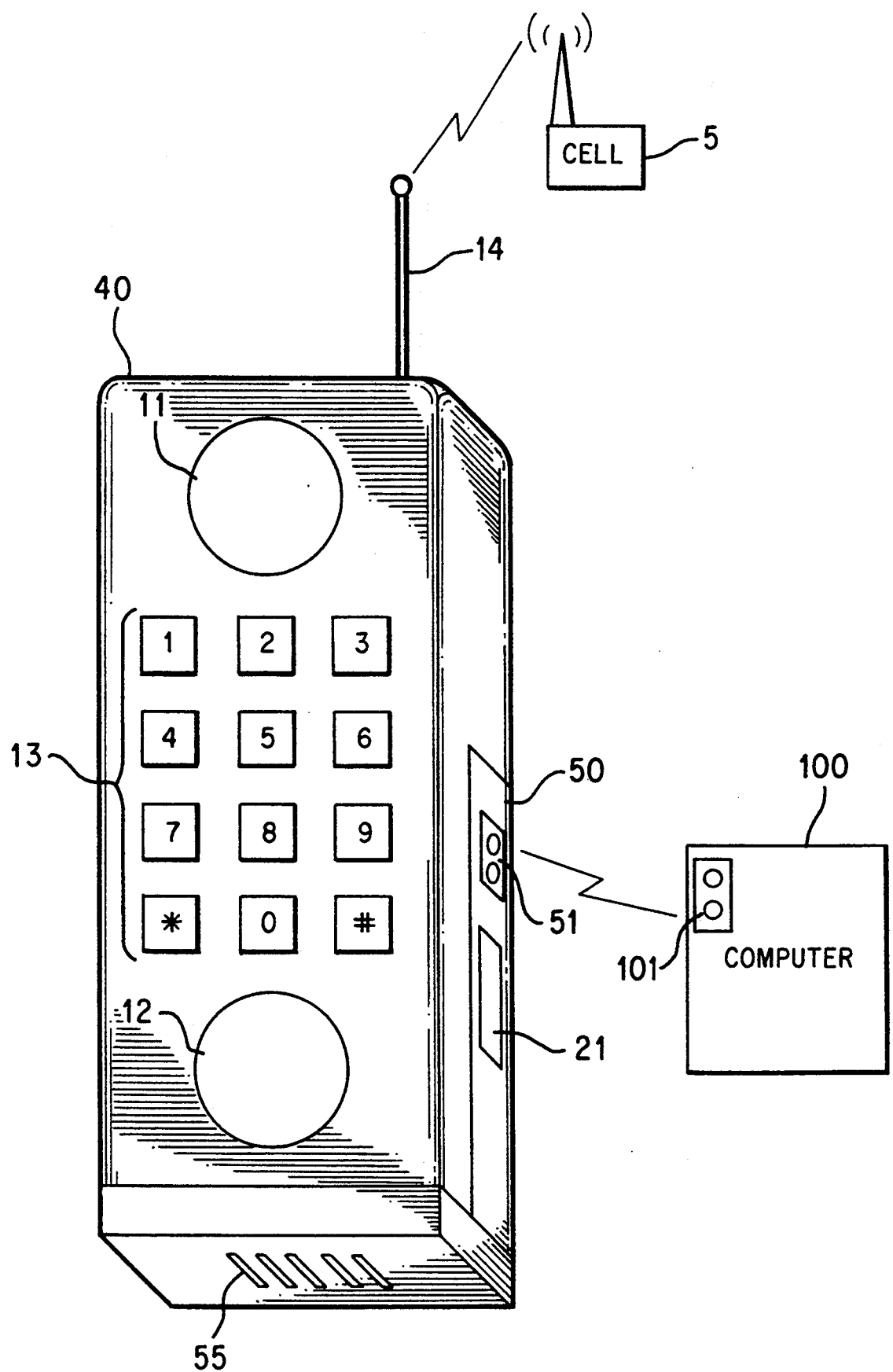
FIG. 3A shows a cellular phone with an infrared battery pack according to the preferred embodiment of the invention.

FIG. 3A shows cellular phone 40 with infrared battery pack 50 of the preferred embodiment of the invention. Like conventional battery pack 20 shown in FIG. 2, battery pack 50 contains one or more batteries 21. Unlike conventional battery pack 20, however, infrared battery pack 50 also contains infrared port 51 for transmitting infrared information between cellular phone 40 and computer 100. For the purposes of this invention, the term "transmitted" shall refer to either one way or two way communication of information (e.g., data, commands, voice, tones, programming codes, etc) between a cellular phone and an electronic device (e.g., computer, modem, watch, etc) capable of sending and/or receiving infrared signals. Computer 100 is similar to computer 38 shown in FIG. 2, but contains infrared port 101 to allow for the transmission of infrared information between cellular phone 40 and computer 100. In the preferred embodiment, computer 100 is an HP 100LX Palmtop PC, manufactured by the Hewlett-Packard Company, although any computer using the well known Serial Infrared (SIR) Standard or other infrared technology could also be used.

In the preferred embodiment, battery pack 50 is removably mounted on the back of cellular phone 40, and also covers the base of cellular phone 40, thereby covering and connecting to device interface 25. In the preferred embodiment, battery pack 50 contains passthru device interface 55. Passthru device interface 55 is connected to device interface 25 and allows for the direct connection of a device, such as computer 38 of FIG. 2, via holster 30. Passthru device interface 55, in addition to enabling communications between cellular phone 40 and a device that lacks infrared capability (such as computer 38), or a device that has infrared capability but for which direct connection is desirable, also allows conventional cellular phone accessories, such as a "hands free" kit, external antenna, external power, etc, to continue to work with cellular phone 40. An alternate embodiment has been contemplated where passthru device interface 55 is not provided, thereby saving the associated costs of such an interface if the aforementioned capabilities of such an interface are not desired.

Figure 3B:
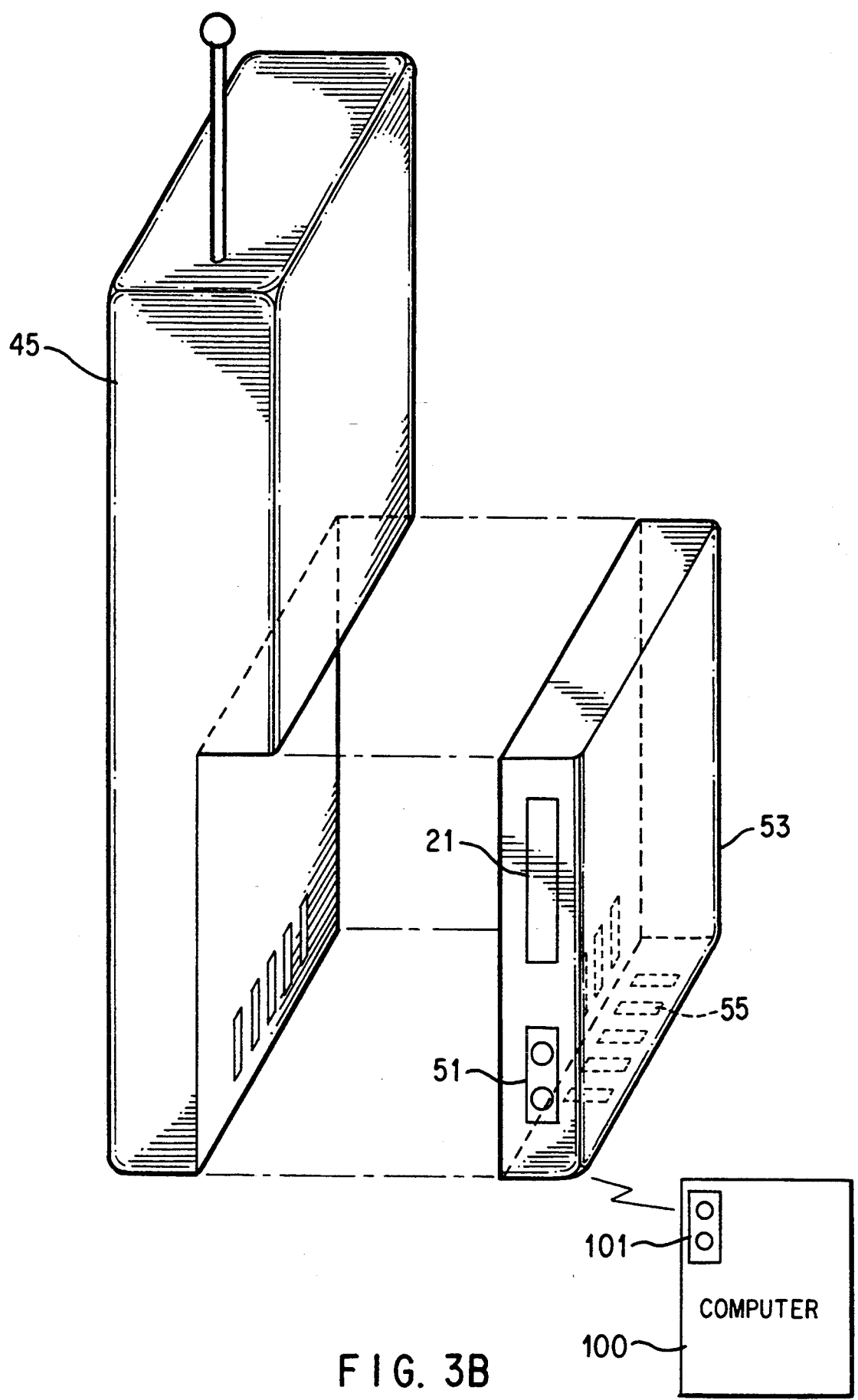
FIG. 3B shows a cellular phone with an infrared battery pack according to an alternate embodiment of the invention.

FIG. 3B shows an alternate embodiment of the invention, where battery pack 53 does not cover the base of cellular phone 45, but instead transmits information between cellular phone 40 and computer 100 through device interface 25 accessible through the back of cellular phone 45. In this embodiment, passthru device interface 55 is at the bottom of battery pack 53. Those skilled in the art will appreciate that the actual location of device interface 25 and passthru device interface 55 can vary from the locations shown in FIGS. 3A–3B and still fall within the spirit and scope of the invention.

Figure 4:
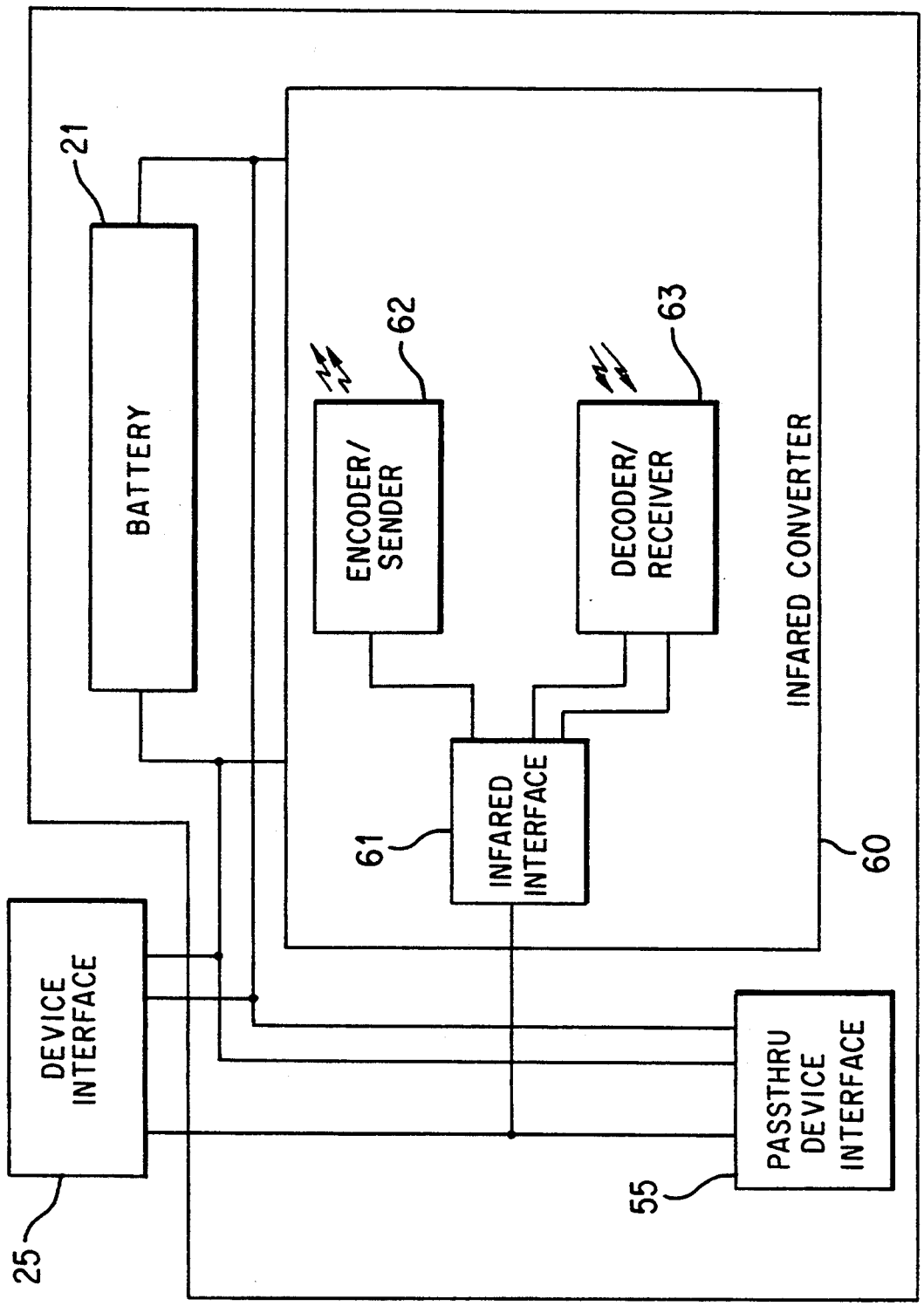
FIG. 4 shows a infrared battery pack according to the preferred embodiment of the invention in more detail.

FIG. 4 shows the infrared battery pack of the preferred embodiment of the invention in more detail. As previously discussed, device interface 25 and passthru device interface 55 are connected together. Both interfaces are also connected to infrared converter 60. Infrared converter 60 contains infrared interface 61, encoder/sender 62, and decoder/receiver 63. This circuitry converts electrical information to infrared information for transmission between cellular phone 40 and computer 100 via infrared port 51. Battery 21 provides power to infrared converter 60 and other circuitry in and connected to cellular phone 40 via device interface 25 and passthru device interface 55, but is not otherwise involved in the transmission of infrared information between cellular phone 40 and computer 100.

Figure 5:
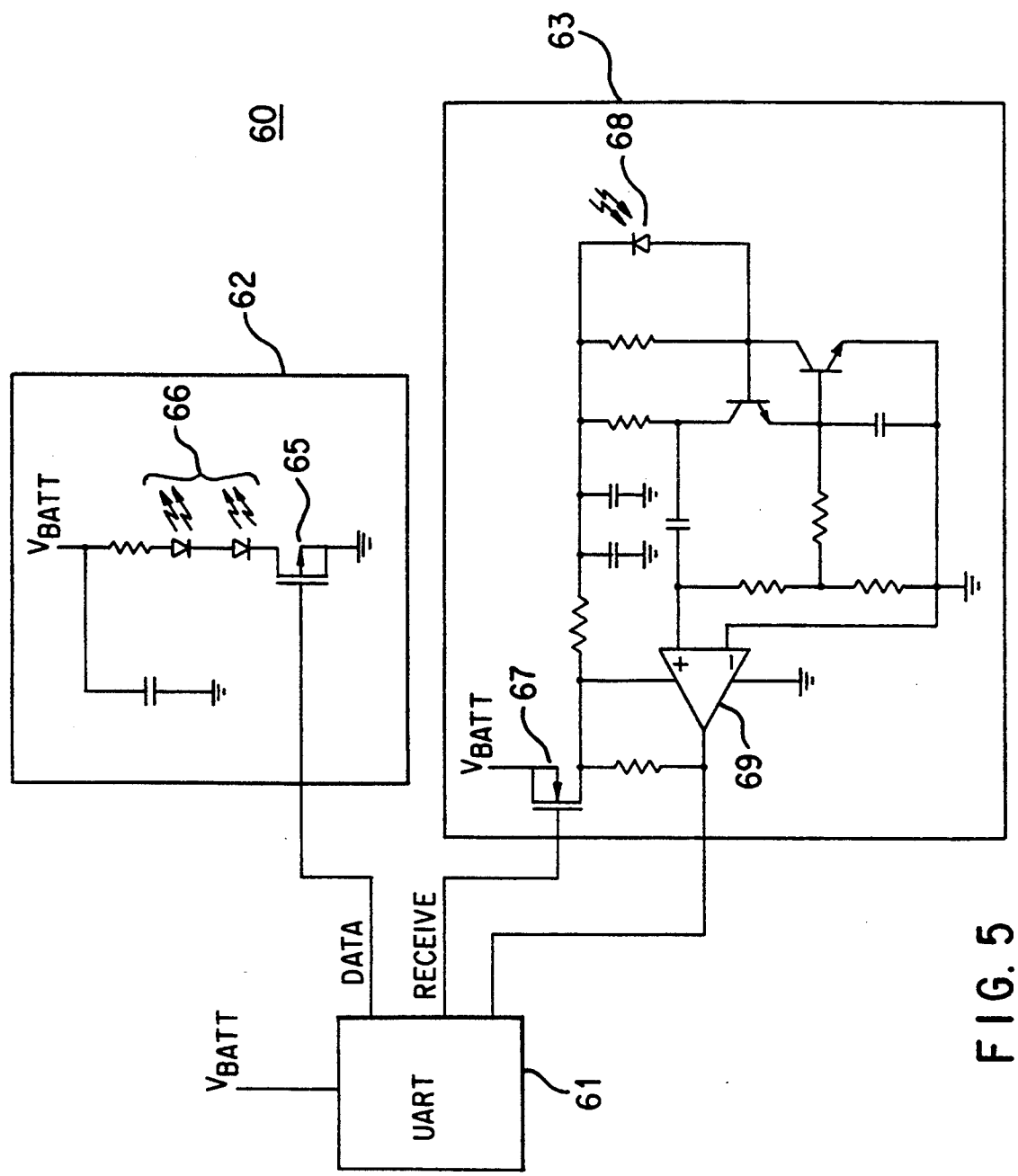
FIG. 5 shows infrared converter circuitry according to the preferred embodiment of the invention in more detail.

FIG. 5 shows the infrared converter circuitry of the preferred embodiment of the invention in more detail. In the preferred embodiment, infrared interface 61 is a 16550-compatible UART controller, although other controllers could be used. In some embodiments, such as where the cellular phone itself performs the control function, a controller may not even be necessary. In these instances, infrared interface 61 merely passes the signals from the cellular phone directly to encoder/sender 62 and decoder/receiver 63.

When encoder/sender 62 receives a high level data signal from infrared interface 61, transistor 65 switches on, thereby causing light emitting diodes 66 to energize. When receiver/decoder 63 receives a low level signal from infrared interface 61 at the base of transistor 67, transistor 67 rams on, thereby turning on operational amplifier 69. This allows any infrared information received from photodiode 68 to be sent to infrared interface 61 as electronic information.

Figure 6:
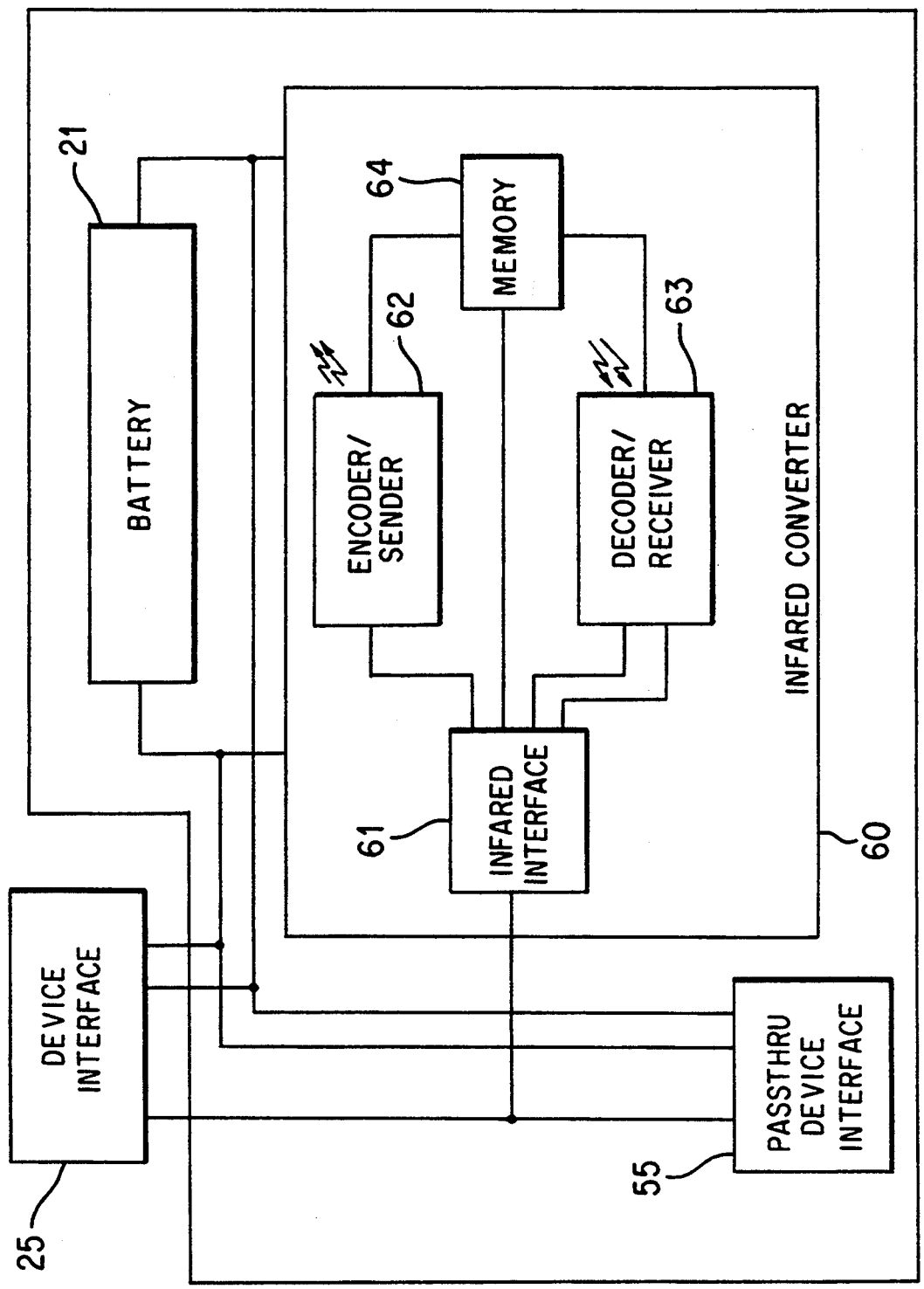
FIG. 6 shows an infrared battery pack according to an alternate embodiment of the invention.

An additional alternate embodiment has been contemplated and is shown in FIG. 6. In this embodiment, the battery pack is capable of operating in a standalone mode. The circuitry for this embodiment would be the same as that shown in FIGS. 4 and 5, with the exception that infrared interface 61, encoder/sender 62 and decoder/receiver 63 are connected to memory 64. In this embodiment, electronic information to be sent by encoder/sender 62 and/or received by decoder/receiver 63 is stored in memory 64 under the direction of controller 61. When the battery pack is connected to a cellular phone, indications to transmit this information between the cellular phone and the electronic device can be provided by the cellular phone via infrared interface 61.

What is claimed is:

1. A cellular phone for communicating with an electronic device, comprising:
    an antenna for receiving RF signals from a telephone cell;
    a speaker for hearing information transmitted from said telephone cell;
    a microphone for transmitting spoken information to said telephone cell;
    a keypad;
    a device interface, said device interface capable of transmitting electronic information between said cellular phone and said electronic device when said electronic device is physically connected to said cellular phone;
    an infrared battery pack, further comprising:
    a battery for powering said cellular phone;
    an infrared port; and
    an infrared converter, connected to said device interface and to said infrared port, for converting said electronic information to infrared information for transmission between said cellular phone and said electronic device over said infrared port;
    said infrared battery pack capable of replacing a conventional battery pack lacking infrared capability for said cellular phone, said cellular phone operating as a fully functional conventional cellular phone when said conventional battery pack is installed, said cellular phone having the ability to communicate with said electronic device over said infrared port when said infrared battery pack is installed.

2. The cellular phone of claim 1, wherein said infrared battery pack covers and connects to said device interface.

3. The cellular phone of claim 2, further comprising:
    a passthru device interface, connected to said device interface and said infrared converter, said passthru device interface capable of transmitting said electronic information between said cellular phone and said electronic device when said electronic device is physically connected to said cellular phone.

4. An infrared battery pack for a cellular phone, comprising:
    a battery for powering said cellular phone; and
    an infrared port for transmitting infrared information between said cellular phone and an electronic device;
    said infrared battery pack capable of replacing a conventional battery pack lacking infrared capability for said cellular phone, said cellular phone operating as a fully functional conventional cellular phone when said conventional battery pack is installed, said cellular phone having the ability to communicate with said electronic device over said infrared port when said infrared battery pack is installed.

5. The infrared battery pack of claim 4, further comprising:

an infrared converter, connected to a device interface in said cellular phone and to said infrared port, for converting electronic information from said device interface to infrared information for transmission between said cellular phone and said electronic device over said infrared port.

6. The infrared battery pack of claim 5, further comprising:

a passthru device interface for connection to said device interface and said infrared converter, said passthru device interface capable of transmitting said electronic information between said cellular phone and said electronic device when said electronic device is physically connected to said cellular phone.

7. The infrared battery pack of claim 4, further comprising:

memory for storing electronic information for transmission between said cellular phone and said electronic device.

8. A method of upgrading a cellular phone having a battery pack and an electronic device interface, wherein the upgraded cellular phone has the ability to communicate with an electronic device over an infrared link, said method comprising the steps of:

removing said battery pack; and replacing said battery pack with an infrared battery pack having a battery for powering said cellular phone, an infrared port, and an infrared converter for connection to a device interface in said cellular phone and to said infrared port, said infrared converter for converting electronic information from said device interface to infrared information for transmission between said cellular phone and an electronic device over said infrared port.

* * * * *